(12) United States Patent
Scherer et al.

(10) Patent No.: US 8,926,473 B2
(45) Date of Patent: Jan. 6, 2015

(54) LOCKING UNIT

(75) Inventors: Georg Scherer, Kirchheim (DE);
Helmut Mang, Memmingen (DE)

(73) Assignee: SVM Schultz Verwaltungs—GmbH & Co. KG, Memmingen (DE)

( * ) Notice: Subject to any disclaimer, the term of this patent is extended or adjusted under 35 U.S.C. 154(b) by 308 days.

(21) Appl. No.: 13/087,996

(22) Filed: Apr. 15, 2011

(65) Prior Publication Data

US 2012/0090951 A1    Apr. 19, 2012

(30) Foreign Application Priority Data

Apr. 16, 2010   (DE) .......................... 10 2010 015 514

(51) Int. Cl.
*F16H 63/38* (2006.01)
*H01F 7/16* (2006.01)
*F16H 61/22* (2006.01)
*F16H 63/34* (2006.01)

(52) U.S. Cl.
CPC .............. *H01F 7/1615* (2013.01); *F16H 61/22* (2013.01); *F16H 63/34* (2013.01)
USPC .......... 477/191; 192/220.4; 192/222; 251/65; 74/473.12; 74/473.26; 335/179

(58) Field of Classification Search
None
See application file for complete search history.

(56) References Cited

U.S. PATENT DOCUMENTS

| 4,660,011 | A | * | 4/1987 | Reiter | ........................... 335/230 |
| 4,988,074 | A | * | 1/1991 | Najmolhoda | ............ 251/129.08 |
| 5,275,065 | A | * | 1/1994 | Ruiter | ......................... 74/483 R |
| 7,328,782 | B2 | * | 2/2008 | De Jonge | .................. 192/220.4 |
| 7,410,038 | B2 | * | 8/2008 | Kleinert et al. | ............... 188/300 |

FOREIGN PATENT DOCUMENTS

| DE | 10 2007 000637 A1 | 5/2008 |
| DE | 10 2008026124 B3 | 2/2010 |
| EP | 1 795 410 A1 | 6/2007 |

OTHER PUBLICATIONS

STIC Machine language translation of DE 102007000637 May 15, 2008.*

* cited by examiner

*Primary Examiner* — Gene Crawford
*Assistant Examiner* — Mark Manley
(74) *Attorney, Agent, or Firm* — Goodwin Procter LLP

(57) ABSTRACT

The invention refers to a locking unit, in particular a transmission locking unit. It consists of a coil encircling at least partly an armature space. The coil has a wire that can be energized by electric current. An armature rod projecting out of the armature space and carrying an armature is provided, as well as an operating element locking unit interacting with the armature rod. This holds or releases, depending on the position of the armature rod, an operating element, wherein the armature rod or the armature is held in a first position by a permanent magnet, and a current flow through the wire of the coil compensates the holding force of the permanent magnet, and the armature rod gets in the second position.

8 Claims, 2 Drawing Sheets

LOCKING UNIT

Figure 1A:
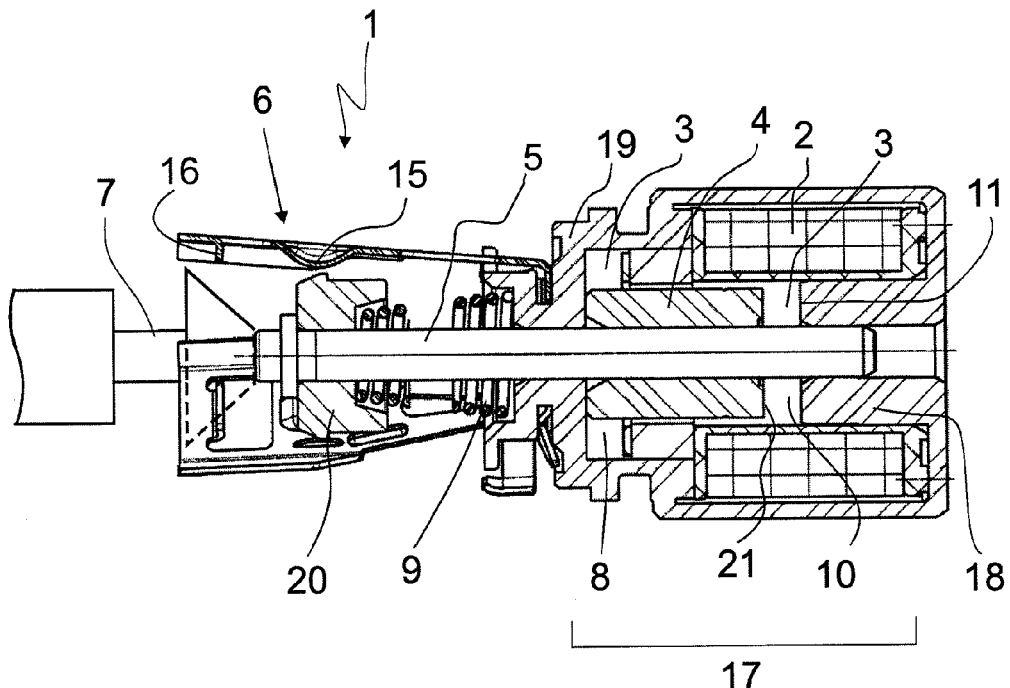

The invention refers to a locking unit, in particular a transmission locking unit comprising a coil encircling at least partly an armature space wherein the coil has a wire that can be energized by electric current. Furthermore, the locking unit has an armature rod projecting out of the armature space and carrying an armature and being movable towards the coil, and an operating element locking device interacting with the armature rod holding or releasing an operating element in a first or second position depending on the control element of the armature rod.

BACKGROUND OF THE INVENTION

The locking unit described before, in particular transmission locking units, are used with vehicles equipped with automatic transmissions or semi-automatic transmissions. The locking units are here supposed to hold the parking brake open during operation. The arrangement is here chosen such that, when the vehicle is ready to run, the vehicle-intern transmission control element system generates hydraulic pressure that acts on an operating element, for example a piston. The piston then pushes by its movement on an armature of the locking unit, and puts it against the pole face of the magnet. The known locking units have a coil with a wire flown through by electric current. The coil is permanently electrified, and the resulting magnetic field develops an appropriate magnetic holding force that attracts the armature with sufficiently high power, and thus defines a first position of the armature rod. The armature rod here interacts with an operating element locking device that holds reliably on to the operating element in this position. This arrangement makes sure that even during lowering or when the hydraulic force acting on the piston is dropped, this does not fall back in its basic position and blocks the vehicle. The known locking unit locks the parking brake in the open condition. Only when the coil current is switched off, the magnetic holding force is reduced so strongly that the locking system opens against the force of a pull-back spring and releases the piston.

The operation of the known locking unit causes a permanent current flow through the windings of the coil. Energy is required.

SHORT ABSTRACT OF THE INVENTION

It is an object of the present invention to suggest a locking unit that is more energy efficient.

In order to solve this problem the invention refers to a locking unit as described in the beginning, and suggests that the armature rod or the armature is held in a first position by a permanent magnet, in particular currentless, and a current flow through the wire of the coil compensates the holding force of the permanent magnet, and the armature rod gets in the second position.

The permanent magnet suggested according to the invention is here integrated in the magnetic circuit of the locking unit in such a way that it holds the armature rod or the armature reliably in a first position, and, because of this first position, the operating element locking device takes a defined position with respect to the holding or releasing of the operating element. It is an essential advantage of the invention that this position can be held currentless, that is without requiring energy.

In order to put the operating element locking device in another position, according to the invention, a current flow is effected through the wire of the coil; for that a short current impulse (a few 100 ms to several seconds) is sufficient depending on the dimensions, to compensate the holding force of the permanent magnet, and thus to allow the armature rod to get in the second position, so that then also the operating element locking device gets into another position. Usually, here the magnetic field generated by the solenoid comprising the coil is directed against the magnetic field of the permanent magnet, and will be equal or larger to reach the compensation as desired.

Cleverly here the current flow required for discarding the permanent magnet is supplied in a small electric or electronic circuit, for example a suitable capacitor, wherein the capacitor is then discharged when, for example, the ignition current is switched off, or another unambiguous event takes place at the vehicle. In this way also an operation-reliable function of the locking unit can be realized.

In a preferred embodiment of the invention it is provided that the operating element acts on the armature rod in such a way that the armature rod gets in the first position, in particular against the force of a pull-back spring. When the vehicle or system is ready to go the operating element (for example a piston that is part of the vehicle internal transmission hydraulic) pushes on the armature rod in such a way that it gets in the first position against the force of a pull-back spring, and the operating element is held there mechanically by the operating element locking device. Of course, it is also possible that the armature rod or the armature gets in the first position by another means, for example with an additional external or internal excitation coil. The arrangement is here chosen such that in the first position an air gap, open in the second position, is closed between the armature and a pole face. The holding force of the permanent magnet is here active across this closed air gap. Therefore it is cleverly provided that the permanent magnet is arranged in the same magnetic circuit as the coil, wherein the coil as part of a solenoid uses the same magnetic circuit. Thus it is easily possible to use the effect of the (solenoid) magnetic field generated by the coil against the magnetic holding force of the permanent magnet to influence in this way the position of the armature rod and thus also the switch position.

The permanent magnet suggested by the invention can be configured and realized here in a wide variety of configurations. The term permanent magnet comprises here a magnet realized as permanent magnet with an appropriately high auto-magnetization and a resulting high holding force. The term permanent magnet comprises here magnets configured in one piece as well as the use of several magnets.

Thus it is provided in a modification according to the invention that the permanent magnet is designed as ring magnet. Alternatively to this it is provided that the permanent magnet is realized as annular arrangement of single segment magnets. The permanent magnet, however, can also be realized as bar magnet, in particular, if the permanent magnet is realized on or in the armature rod or on or in the armature. The available constructive volume may be smaller here as the one if the permanent magnet encircles the armature space, and the resulting holding forces also, however, this can be completely sufficient if the locking unit is dimensioned accordingly.

Therefore the invention comprises solutions where the permanent magnet encircles the armature space or is connected directly to it, is, in particular, essentially stationary in the locking unit, as well as solutions where the permanent magnet is movable with reference to the coil as it is arranged on the armature rod and/or the armature.

The term permanent magnet comprises very different geometric designs as single magnet or the spatial arrangement of a number of magnets, for example segment magnets, in order to realize a circle or ring configuration. When the permanent magnet is arranged around the armature space, it is in particular favorable that the permanent magnet is magnetized radial. However, it is also provided according to the invention that the permanent magnet is magnetized axially, in particular if it is arranged on the armature or the armature rod.

For arranging the permanent magnet in the locking unit or in the locking unit comprising the solenoid, there is a number of modifications according to the invention. First of all, it is possible to imbed the permanent magnet in a suitable way in the housing of the solenoid. In another modification it is convenient that the permanent magnet or the arrangement of segment magnets forming the permanent magnet realizes the coil former of the coil. For example, on the coil former a corresponding receiving pocket is provided for the segment magnets, or the coil former is spayed on around the permanent magnet, and thus carries the permanent magnet. Without any problems it can be seen that the invention can be adapted here in a wide variety of ways to the respective case of application. Integrating the permanent magnet on the coil former of the coil allows here a prefabrication of these assembly in an integrative step; such an idea is in particular made easier by the fact that both elements, permanent magnet and coil, use the same magnetic circuit.

The invention, however, comprises furthermore a solution where an in particular annular holding device separated from the coil former of the coil for the permanent magnet or the arrangement of single segment magnets is provided. Thus in a simple way also a modular system can be configured for dimensioning the magnetically active elements of the magnetic circuit of the solenoid.

The locking unit according to the invention has an operating element locking device that can be realized, according to the invention, in a wide variety of configurations. As operating element locking device, for example, radial shifting balls are provided engaging in corresponding circular grooves, and thus reduce or exclude the mobility of the operating element.

A similar function can also be achieved with correspondingly acting levers or bolts. In a preferred modification of the invention it is provided furthermore that the operating element locking device consists of at least one latching pawl with a guide nose or a catch, the guide nose interacting with a guide projection of the armature rod, and the catch nose getting hold of the operating element, if necessary with clearance for movement.

The invention comprises a locking unit as well as, in particular, a transmission locking unit where the transmission locking unit is in re-connection with the transmission. This re-connection is carried out in the control element; as described, the control element can be, for example, a part of the piston moving by the hydraulic pressure of the transmission.

BRIEF DESCRIPTION OF THE DIFFERENT VIEWS OF THE DRAWING

Figure 1B:
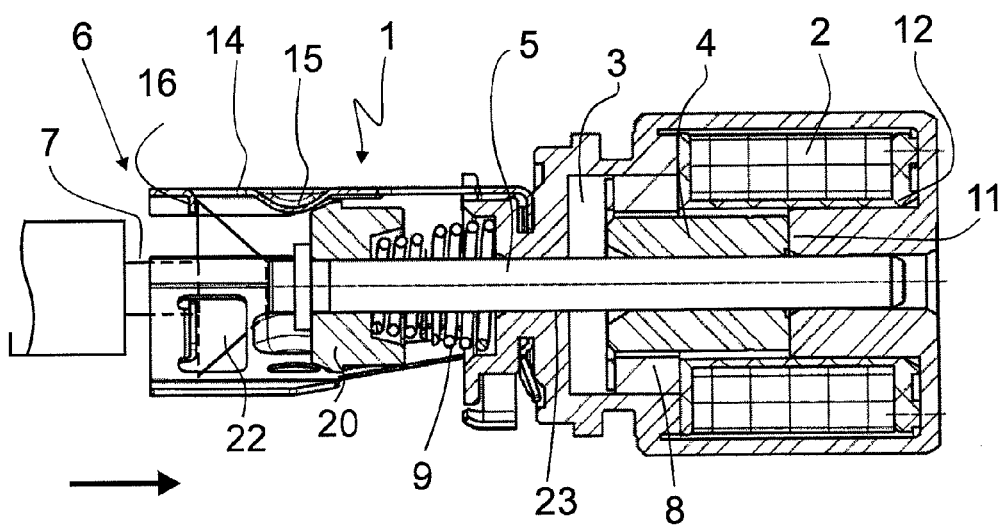
Figure 2A:
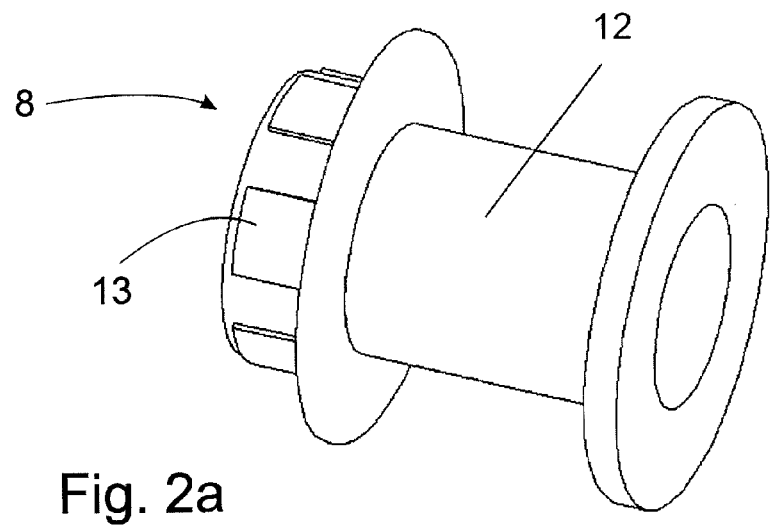
Figure 2B:
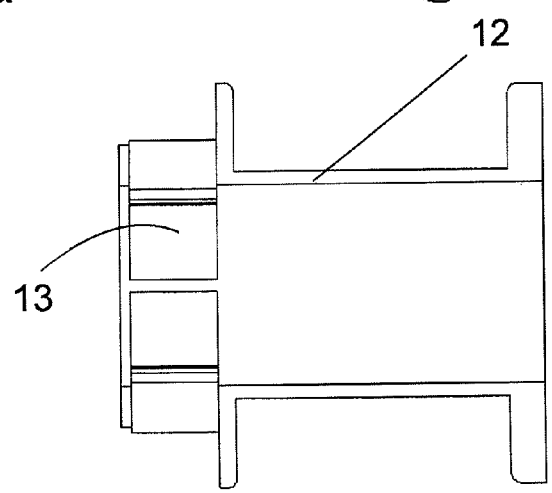
Figure 2C:
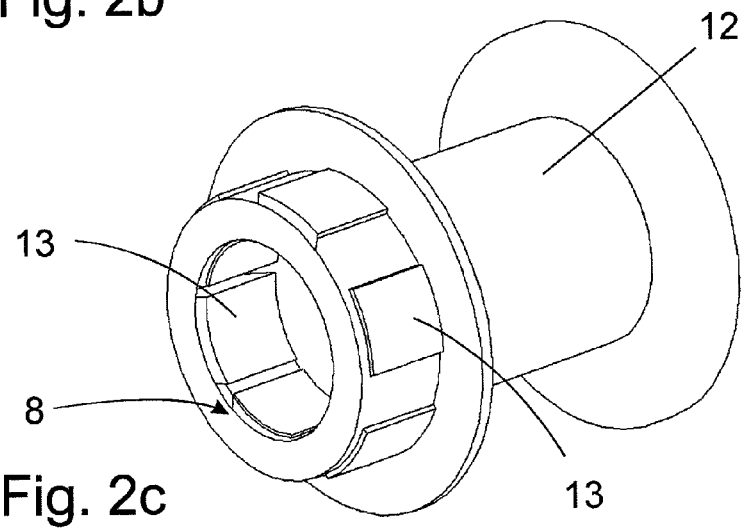

In the drawing the invention is shown schematically in an embodiment. In the figures:

FIG. 1a: The locking unit according to the invention in a view in open position;

FIG. 1b: The locking unit according to the invention in the view in the holding position;

FIGS. 2a, 2b, 2c: in different, partly three-dimensional views (FIGS. 2a, 2b) a coil former as detail of the invention.

DETAILED DESCRIPTION OF THE PREFERRED EMBODIMENT

In the figures identical or corresponding elements each are referred to by the same reference numbers, and therefore are, if not useful, not described anew.

The locking unit 1 according to the invention is shown in two different positions in FIGS. 1a, 1b. On the right hand area in the locking unit 1 a typical solenoid 17 is arranged. It consists of a coil 2 carrying a wire that can be energized by electric current in a number of windings. The coil 2 encircles an armature space 3, wherein the armature space 3, seen in axial direction of the coil 2, even extends further beyond the coil 2 to the left. The solenoid 17 is closed by a pole part 18 immerging somewhat in the coil 2. The armature space 3 verges on the pole face 11 of the pole part 18.

In the armature space 3 an armature 4 is supported movably axially (with reference to the longitudinal axis of the coil 2). The armature 4 is connected with the armature rod 5 that immerges for guiding reasons, on the one hand, in a boring of the pole part 18, and, on the other side of the armature 4, projects out of the armature space 3 and acts on the operating element 7, or is influenced by it. The housing 19 encircling the solenoid 17 here has an opening through which the armature rod 5 is guided. Outside the solenoid 17, in the example shown here, in the armature rod 5 a guide projection 20 is provided that is configured cone-like or flange-like, that means it has a clearly larger diameter than the diameter of the armature rod 5. The guide projection 20 is arranged fixedly on the armature rod 5, and is, at the same time, also a support bearing for a pull-back spring 9 slid on the armature rod 5, between the guide projection 20 and the housing 19. When the armature 4 moves to the right for bridging the air gap 10 between the end face 21 of the armature and the pole face 11, the pull-back spring 9 is compressed. This situation is described in FIG. 1b; according to the invention, this arrangement, referred to as first position, is held in particular currentless by a permanent magnet 8. This first position is reached by producing e.g. a connection, for example by the (external) operating element 7, with a transmission of a vehicle or the steering of a vehicle, and shifting it to the right in such a way that also the armature rod is shifted to the right.

In the magnetic circuit of the solenoid a permanent magnet 8 is provided. This permanent magnet 8 develops a holding force across the air gap 10 and thus holds this first position of the armature rod 5 reliably.

In the example shown here the permanent magnet 8 is located between the coil 2 and the operating element locking device 6 or the opening 23 in the housing 19 through which the armature rod 5 is guided out.

The operating element locking device 6 consists of one or more latching pawls 14 carrying out here an essential radial motion, with reference to the longitudinal axis of the armature rod 5 or the axis of the coil 2. The latching pawl 14 has here on its side opposite the solenoid a catch 16 interacting in a catching way in a corresponding projection 22 of the operating element 7. Because of the elastic function of the latching pawl 14 the catch 16 grips behind the projection 22, and thus fixes the operating element 7, that means the catch 16 locks it. In this case, thus the first position of the armature rod 5 communicates with the fixed position of the operating element 7 by the operating element locking device 6.

It is an essential advantage of the invention that this first position is realized by the permanent magnet 8 without using energy.

Now, the wire winding of the coil 2 is electrified at least by a current impulse or current flow, so that a magnetic field develops in the coil 2 which is orientated in particular in such a way, that it is in opposite direction of the magnetic field of the permanent magnet 8. The strength is chosen here such that the holding force of the permanent magnet 8 pressing the armature 4 on the pole face 11 is overcome.

The result is then that the spring energy stored in the pull-back spring 9 effects a shifting of the armature rod 5 to the left, as shown in FIG. 1*a*.

The guide projection 20 is also shifted here to the left, and its guide flanks interact with the guide nose 15 of the latching pawl 14. Thus the projection 22 spreads the latching pawl 14 outwards, the catch 16 releases the projection 22 of the operating element 7.

The operating element 7 then can recede accordingly and take other switching positions, for example define the parking position or the like.

FIGS. 2*a*, 2*b*, 2*c* show in a modification according to the invention the coil former forming the coil 2. The permanent magnet is realized in the example shown here by a number of segment magnets 13 arranged on or integrated in an annular extension on the winder-like (i.e., bobbin-shaped) coil former 12. The arrangement of a number of segment magnets makes realizing the permanent magnet according to the invention easier.

Although the invention has been described in terms of specific embodiments which are set forth in considerable detail, it should be understood that this is by way of illustration only and that the invention is not necessarily limited thereto, since alternative embodiments and operating techniques will become apparent to those skilled in that art in view of the disclosure. Accordingly, modifications are contemplated which can be made without departing from the spirit of the described invention.

The invention claimed is:

1. A locking unit, comprising:
    a coil former including a coil-holding portion and an annular extension extending from the coil-holding portion;
    a coil held by the coil former on the coil-holding portion, the coil at least partly encircling an armature space, the coil having a wire configured to be energized by an electric current;
    an armature rod projecting out of the armature space and carrying an armature;
    an operating element locking device configured to interact with the armature rod, the operating element locking device holding or releasing the armature rod depending on the armature rod being in a first position or a second position, respectively; and
    a permanent magnet configured as an annular arrangement of single segment magnets, each segment magnet integrated in a receiving pocket provided in the annular extension of the coil former, and being located between the coil and the operating element locking device,
    the armature rod or the armature being held in the first position by the permanent magnet, wherein a magnetic field generated in the coil upon flow of the electric current through the wire of the coil is oriented in opposite direction of a magnetic field of the permanent magnet and compensates a holding power of the permanent magnet to move the armature rod to the second position.

2. The locking unit according to claim 1, the locking unit further comprising:
    a pull-back spring, wherein
    the operating element acts on the armature rod in such a way that the armature rod moves to the first position against the power of the pull-back spring.

3. The locking unit according to claim 1, the locking unit further comprising:
    a pole face and an air gap open in the second position, wherein in the first position the air gap open in the second position is closed between the armature and the pole face.

4. The locking unit according to claim 1, the locking unit further comprising:
    a magnetic circuit, wherein
    the permanent magnet is arranged in the same magnetic circuit as the coil.

5. The locking unit according to claim 1, wherein the permanent magnet encircles the armature space or is directly connected to it.

6. The locking unit according to claim 1, wherein the permanent magnet is magnetized either radial or axially.

7. The locking unit according to claim 1, further comprising:
    at least one latching pawl having a guide nose and a catch on an armature rod-side of the latching pawl; and
    a guide projection on the armature rod, wherein
    the catch is engaged with the operating element when the armature or the armature rod is in the first position, and
    the guide projection of the armature rod pushes on the guide nose of the latching pawl to disengage the catch from the operating element when the armature or the armature rod moves to the second position.

8. The locking unit according to claim 1 in combination with a transmission and a transmission control, wherein
    the operating element is in active connection with the transmission or the transmission control.

* * * * *